(12) United States Patent
Lin et al.

(10) Patent No.: US 12,080,037 B2
(45) Date of Patent: Sep. 3, 2024

(54) READING SYSTEM, READING METHOD, AND STORAGE MEDIUM

(71) Applicants: KABUSHIKI KAISHA TOSHIBA, Tokyo (JP); TOSHIBA ENERGY SYSTEMS & SOLUTIONS CORPORATION, Kawasaki (JP)

(72) Inventors: Chiayu Lin, Ota (JP); Tsubasa Kusaka, Yokohama (JP)

(73) Assignees: KABUSHIKI KAISHA TOSHIBA, Tokyo (JP); TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 0 days.

(21) Appl. No.: 17/749,771

(22) Filed: May 20, 2022

(65) Prior Publication Data

US 2022/0284690 A1 Sep. 8, 2022

Related U.S. Application Data

(60) Division of application No. 17/020,282, filed on Sep. 14, 2020, now Pat. No. 11,386,640, which is a
(Continued)

(30) Foreign Application Priority Data

Mar. 23, 2018 (JP) .................................. 2018-056702
Jul. 9, 2018 (JP) .................................. 2018-130053

(51) Int. Cl.
*G06K 9/00* (2022.01)
*G06T 7/543* (2017.01)
(Continued)

(52) U.S. Cl.
CPC .............. *G06V 10/25* (2022.01); *G06T 7/543* (2017.01); *G06T 7/564* (2017.01); *G06V 10/44* (2022.01)

(58) Field of Classification Search
CPC .... G06V 10/44; G06V 2201/02; G06V 10/25; G06V 10/247; G06T 7/543; G06T 7/564;
(Continued)

(56) References Cited

U.S. PATENT DOCUMENTS 4,680,704 A * 7/1987 Konicek ................ G01D 4/008
356/615
5,673,331 A * 9/1997 Lewis .................... G06V 10/10
340/870.02
(Continued)

FOREIGN PATENT DOCUMENTS

CN 106529559 A * 3/2017 ............. G06V 10/20
CN 107066998 A 8/2017
(Continued)

OTHER PUBLICATIONS

Harsh et al ("HMI-Guard: A Platform for Detecting Errors in Human-Machine Interfaces", 2017 IEEE International Conference on Systems, Man, and Cybernetics (SMC) Banff Center, Banff, Canada, Oct. 5-8, 2017. (Year: 2017).*
(Continued)

*Primary Examiner* — Shervin K Nakhjavan
(74) *Attorney, Agent, or Firm* — Oblon, McClelland, Maier & Neustadt, L.L.P.

(57) ABSTRACT

According to one embodiment, a reading system includes an extractor, a generator, a corrector, and a reader. The extractor extracts a first candidate region from an input image. The first candidate region is of a candidate of a region in which a meter is imaged. The generator generates a rectangle around the first candidate region when an exterior form of
(Continued)

the first candidate region is circular. The rectangle corresponds to the exterior form of the first candidate region. The corrector generates a second candidate region by using the generated rectangle to correct the exterior form of the first candidate region to approach a perfect circle. The reader reads, from the second candidate region, a numerical value indicated by the meter.

18 Claims, 8 Drawing Sheets

Related U.S. Application Data continuation of application No. PCT/JP2019/006228, filed on Feb. 20, 2019.

(51) Int. Cl.
  *G06T 7/564* (2017.01)
  *G06V 10/25* (2022.01)
  *G06V 10/44* (2022.01)
(58) Field of Classification Search
  CPC .... G06T 7/75; G06T 7/73; G06T 3/00; G06T 7/60
  See application file for complete search history.

(56) References Cited

U.S. PATENT DOCUMENTS

| | | | | |
|---|---|---|---|---|
| 5,870,140 | A * | 2/1999 | Gillberry | G01D 5/39 348/160 |
| 8,594,365 | B2 * | 11/2013 | Derkalousdian | G06F 18/00 382/152 |
| 2005/0219632 | A1 | 10/2005 | Maki et al. | |
| 2006/0045389 | A1 * | 3/2006 | Butterworth | G06V 10/44 382/321 |
| 2006/0153458 | A1 * | 7/2006 | Butterworth | G06F 18/00 382/218 |
| 2008/0148877 | A1 * | 6/2008 | Sim | G01D 4/008 73/866.1 |
| 2010/0214130 | A1 * | 8/2010 | Weinmann | G01C 23/00 382/104 |
| 2012/0201423 | A1 | 8/2012 | Onai et al. | |
| 2015/0272546 | A1 * | 10/2015 | Cheon | G16H 50/30 600/440 |
| 2016/0086034 | A1 * | 3/2016 | Kennedy | G06V 10/28 382/200 |
| 2016/0109263 | A1 * | 4/2016 | Dubs | G06V 20/00 348/160 |
| 2018/0005044 | A1 * | 1/2018 | Olson | H04N 23/57 |
| 2018/0129173 | A1 | 5/2018 | Kusaka | |
| 2019/0095739 | A1 * | 3/2019 | Gao | B60K 35/00 |
| 2019/0180487 | A1 * | 6/2019 | Abe | G06T 11/206 |
| 2020/0106933 | A1 * | 4/2020 | Lata | H04N 23/64 |
| 2021/0012140 | A1 | 1/2021 | Lin et al. | |

FOREIGN PATENT DOCUMENTS

| | | | | |
|---|---|---|---|---|
| CN | 108629347 | A * | 10/2018 | .......... G06K 9/3233 |
| CN | 107490398 | B * | 7/2019 | .............. G01D 5/39 |
| JP | 2005-341452 | A | 12/2005 | |
| JP | 2006-120133 | A | 5/2006 | |
| JP | 2007-114828 | A | 5/2007 | |
| JP | 2008-243103 | A | 10/2008 | |
| JP | 2011-90374 | A | 5/2011 | |
| JP | 5712801 | B2 | 5/2015 | |
| JP | 2017-126187 | A | 7/2017 | |
| JP | 2018-81668 | A | 5/2018 | |
| JP | 2019-169116 | A | 10/2019 | |
| JP | 2020-161188 | A | 10/2020 | |

OTHER PUBLICATIONS

Gellaboina et al ("Analog Dial Gauge Reader for Handheld Devices", 2013 IEEE 8th Conference on Industrial Electronics and Applications (ICIEA)) (Year: 2013).*

International Search Report dated May 21, 2019 in PCT/JP2019/006228 filed Feb. 20, 2019 (with Engiish Transiation of Categories of Cited Documents).

Harsh et al ("HM I-Guard: A Platform for Detecting Errors in Human-Machine Interfaces". Department of Electrical. Computer and Software Engineering University of Ontario Institute of Technology, Oshawa, ON, Canada, Oct. 5-8, 2017).

Zhang et al ("Research on the Pre-processing Method of Automatic Reading Water Meter System". 2009 International Conference on Artificial Intelligence and Computational Intelligence).

Decision to Grant issued May 9, 2024 in Chinese Patent Application No. 201980019593.7, with concise English translation, citing document 15 therein.

\* cited by examiner ional of U.S. patent application Ser. No.
READING SYSTEM, READING METHOD, AND STORAGE MEDIUM

CROSS-REFERENCE TO RELATED APPLICATIONS

This is a divisional of U.S. patent application Ser. No. 17/020,282, filed on Sep. 14, 2020 (the entire contents of which are incorporated herein by reference), which is a continuation application of International Patent Application PCT/JP2019/006228, filed on Feb. 20, 2019, which claims priority to Japanese Patent Application No. 2018-056702, filed on Mar. 23, 2018 and Japanese Patent Application No. 2018-130053, filed on Jul. 9, 2018.

FIELD

Embodiments described herein relate generally to a reading system, a reading method, and a storage medium.

BACKGROUND

There is a system that reads a numerical value indicated by a meter. It is desirable for the system to have high accuracy of reading the numerical value.

DETAILED DESCRIPTION

Figure 1:
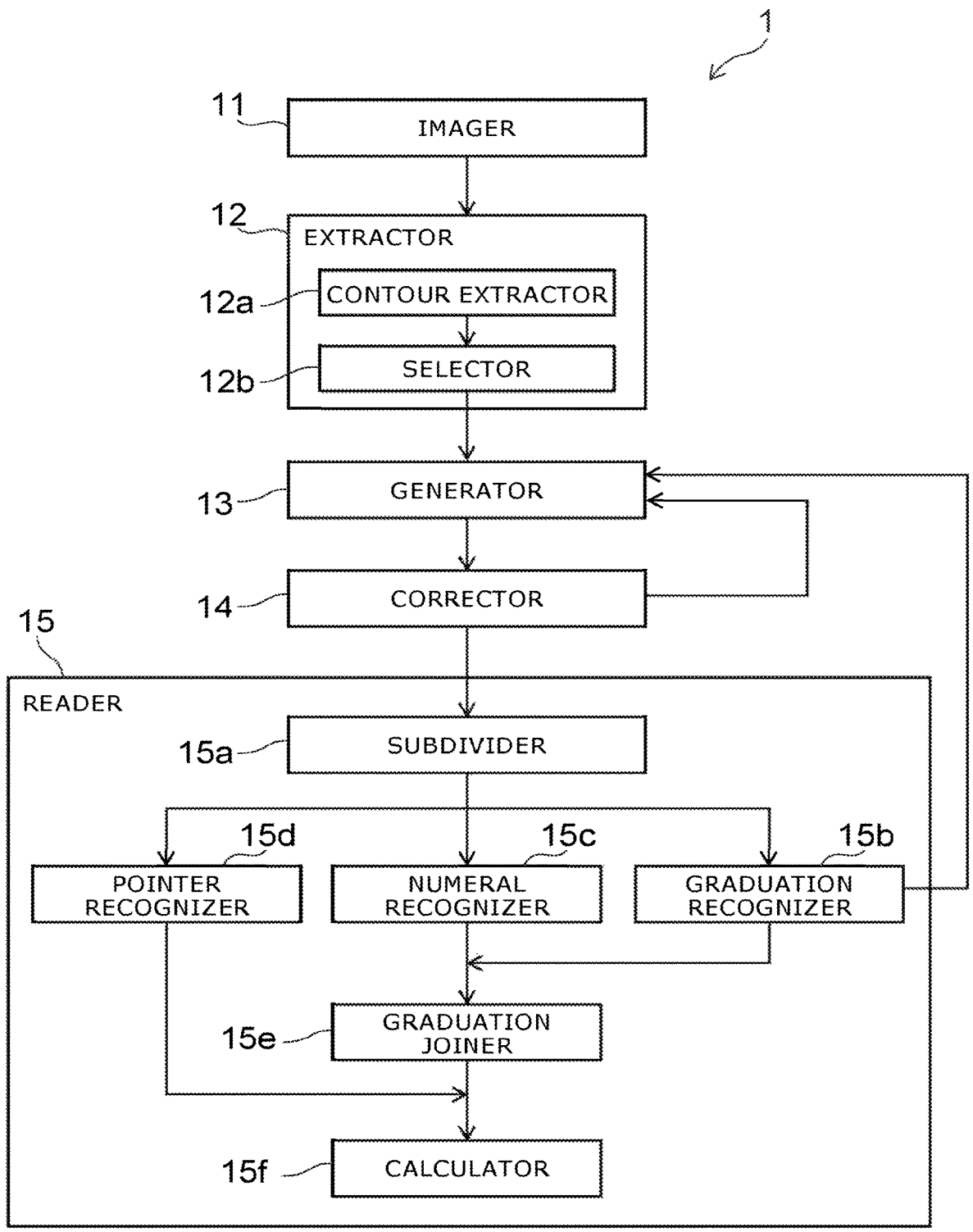
FIG. 1 is a block diagram illustrating a configuration of a reading system according to an embodiment.

According to one embodiment, a reading system includes an extractor, a generator, a corrector, and a reader. The extractor extracts a first candidate region from an input image. The first candidate region is of a candidate of a region in which a meter is imaged. The generator generates a rectangle around the first candidate region when an exterior form of the first candidate region is circular. The rectangle corresponds to the exterior form of the first candidate region. The corrector generates a second candidate region by using the generated rectangle to correct the exterior form of the first candidate region to approach a perfect circle. The reader reads, from the second candidate region, a numerical value indicated by the meter.

Various embodiments are described below with reference to the accompanying drawings.

In the specification and drawings, components similar to those described previously or illustrated in an antecedent drawing are marked with like reference numerals, and a detailed description is omitted as appropriate.

FIG. 1 is a block diagram illustrating a configuration of a reading system according to an embodiment.

FIGS. 2A to 2E are schematic views for describing processing of a generator and a corrector of the reading system according to the embodiment.

FIGS. 3A to 3D are schematic views for describing processing of a reader of the reading system according to the embodiment.

The reading system 1 according to the embodiment is used to read a numerical value indicated by a pointer in a meter from an image including the meter. The reading system 1 according to the embodiment is used favorably for a meter including a pointer rotating around a rotation axis, and multiple graduations arranged along a circumferential direction around the rotation axis. In the meter to be read, the multiple graduations may be arranged in a circular or circular arc-like configuration. The meter further includes a display panel on which the multiple graduations are marked, and numerical values marked to correspond to at least a portion of the multiple graduations. Typically, in such a meter, the outer rim, the outer frame, and the like of the display panel are a circle or circular (e.g., an ellipse, an oval, etc.). In the description of the embodiments hereinafter, such a meter is called a round meter.

As illustrated in FIG. 1, the reading system 1 according to the embodiment includes an imager 11, an extractor 12, a generator 13, a corrector 14, and a reader 15.

The imager 11 acquires a static image by imaging a round meter. The imager 11 outputs the acquired image to the extractor 12. When a video image is imaged by the imager 11, a static image is cut out from the video image and output to the extractor 12. An object other than a round meter may be imaged in the image.

The extractor 12 extracts, from the image that is input, a candidate of a region in which a round meter is imaged. Here, the image that is imaged by the imager 11 and input to the extractor 12 is called the input image. A region that is a portion of the input image and is a candidate of the round meter is called a first candidate region. The first candidate region is a portion of the input image in which the round meter is determined by the extractor 12 to be imaged. Multiple first candidate regions may be output from the extractor 12.

As one specific example, the extractor 12 includes a contour extractor 12a and a selector 12b.

For example, the contour extractor 12a extracts a contour included in the input image based on a brightness difference of the input image. The contour extractor 12a may perform additional processing of the input image as appropriate when extracting the contour. For example, the contour extractor 12a may convert the input image into a grayscale, subsequently binarize the image, and extract a contour of a region illustrated using white from the binary image.

The selector 12b calculates the surface area of the region surrounded with the contour. When multiple contours are extracted, the surface area of each region is calculated. The selector 12b compares each calculated surface area to a prescribed threshold and selects only the regions for which the surface area is not less than the threshold. Thereby, regions that have surface areas that are too small are excluded from the candidates.

The selector 12b detects the shape of the contour. The selector 12b excludes the contour from the candidates when the shape of the contour is not circular or rectangular.

Thereby, a region that includes a circular or rectangular contour and has not less than a prescribed surface area is selected as the first candidate region and output to the generator 13.

The generator 13 determines whether or not the exterior form of the first candidate region is circular or rectangular. When the exterior form of the first candidate region is rectangular, the first candidate region can be corrected (a projective transformation) by utilizing the exterior form. Therefore, for example, the generator 13 outputs the first candidate region as-is to the corrector 14. Circular means a shape such as an ellipse, an egg-like shape, an oval, or the like that is macroscopically rounded.

For example, the round meter may be disposed at a position separated from the imager 11 and may be tilted with respect to the lens surface of the imager 11. In such a case, the outer edge of the round meter in the image is substantially an ellipse. Or, the round meter may be disposed proximately to the imager 11 and tilted with respect to the lens surface of the imager 11. In such a case, the outer edge of the round meter in the image is egg-shaped according to the lens characteristics of the imager 11, etc.

Figure 2A:
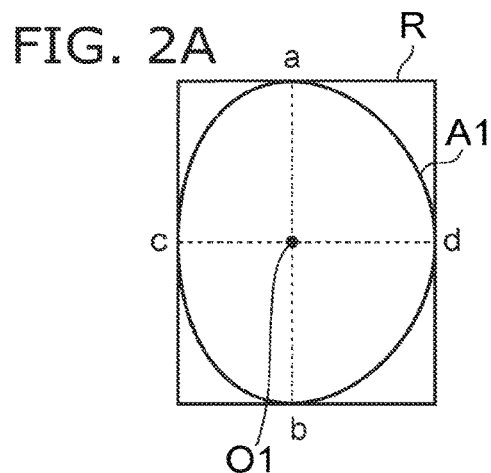
FIGS. 2A to 2E are schematic views for describing processing of a generator and a corrector of the reading system according to the embodiment.
Figure 2B:
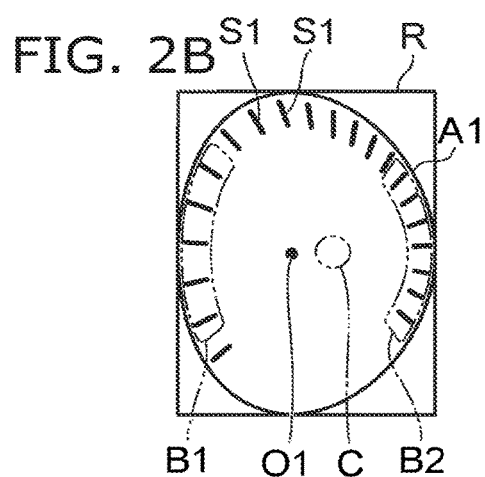

When the exterior form of the first candidate region is circular, the generator 13 detects a rectangle that circumscribes the first candidate region. For example, as illustrated in FIG. 2A, the generator 13 detects a rectangle R that circumscribes points a, b, c, and d of the first candidate region A1. Then, for the points a, b, c, and d, the generator 13 connects points on mutually-opposing sides of the rectangle R. In the example of FIG. 2A, the point a and the point b are connected, and the point c and the point d are connected. Then, the generator 13 detects the intersection of these line segments as a center point O1 of the first candidate region A1.

Then, the generator 13 extracts graduations S1 of the round meter based on, for example, the luminance difference in the first candidate region A1. Continuing, the generator 13 detects a central region that includes the center of the round meter by performing at least one of the following first method or second method.

In the first method, the generator 13 detects the density of the graduations S1 in each of multiple regions in the first candidate region A1. When the first candidate region A1 is distorted, fluctuation occurs in the density of the graduations S1. Specifically, as in a region B1 and a region B2 illustrated in FIG. 2B, the spacing between the graduations S1 decreases and the density increases as the graduations S1 are positioned more depthward with respect to the imager 11. The center of the meter exists more proximately to the region where the density is high than to the region where the density is low. The center of the meter exists more proximately to the region where the density is high as the density difference between the regions increases. Based on the density difference between the regions, the generator 13 detects a central region C where the likelihood of the center of the round meter existing is high.

Figure 2C:
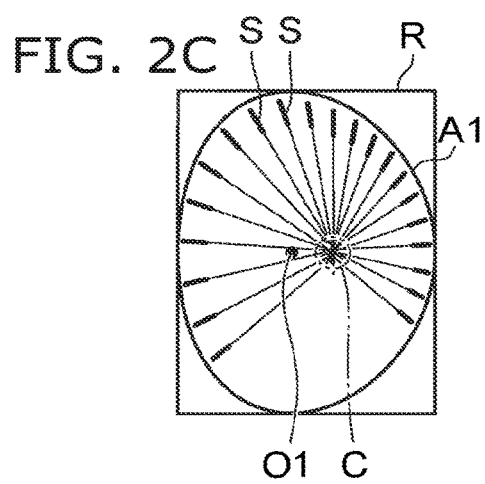

In the second method, the generator 13 generates extension lines E1 along the detected graduations S1. Then, as illustrated in FIG. 2C, the region where the intersections of the extension lines E1 are clustered is detected as the central region C.

The generator 13 may narrow down the central region C by combining the first method and the second method.

Figure 2D:
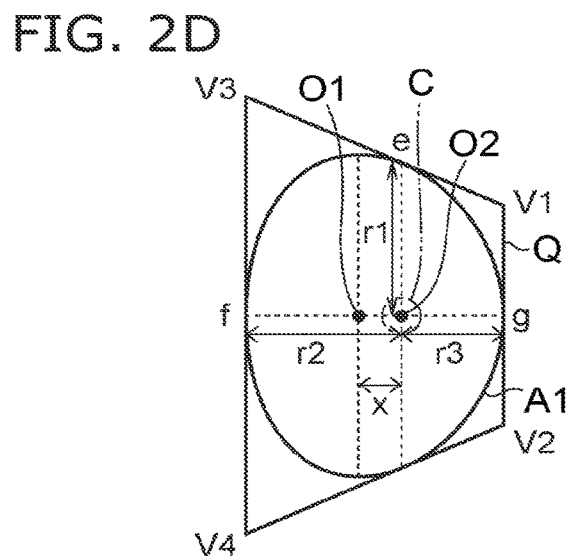

Then, the generator 13 assumes a point O2 in the central region C at a location a distance x from the center point O1 to be the center point of the round meter. The direction of the distance x is the short-side direction of the rectangle R (the short-axis direction of the first candidate region A1). As illustrated in FIG. 2D, the generator 13 calculates multiple distances r1, r2, and r3 from the center point O2 of the round meter that is set to the outer edge of the first candidate region A1.

The distance r1 is the distance between the point O2 and a point e on the outer edge of the first candidate region A1. The point e is the intersection between the outer edge of the first candidate region A1 and a line that is parallel to the short side of the rectangle R and passes through the point O2. The distance r2 is the distance between the point O2 and a point f on the outer edge of the first candidate region A1. The distance r3 is the distance between the point O2 and a point g on the outer edge of the first candidate region A1. The points f and g are at the intersections between the outer edge of the first candidate region A1 and a line that is parallel to the long side of the rectangle R and passes through the point O2.

Based on the distances r1 to r3 and the characteristics of the imager 11, the generator 13 generates a rectangle Q corresponding to the exterior form of the first candidate region A1 around the first candidate region A1. Favorably, the rectangle Q contacts the outer edge of the first candidate region A1. By using the circumscribing rectangle Q to perform a projective transformation described below, the first candidate region A1 can be corrected more accurately (caused to approach a more perfect circle).

An example of a method for generating the circumscribing rectangle Q will now be described. The focal length of the lens of the imager 11 is taken as f. The distance between the imager 11 and the point O2 is taken as $S_O$. For example, the distance $S_O$ is calculated based on the focal position of the imager 11. The tilt of the round meter with respect to the optical axis of the imager 11 is taken as $\theta$. The actual radius of the round meter is taken as R.

The following Formula (1) to Formula (3) hold for the distances r1 to r3, the focal length f, the distance $S_O$, the tilt $\theta$, and the radius R.

$$r1 = R \cdot f / S_O \tag{1}$$

$$r3 = f \cdot \cos\theta \cdot (\ln(R \sin\theta + S_O) - \ln(S_O)) \tag{2}$$

$$r2 = f \cdot \cos\theta \cdot (-\ln(-R \sin\theta + S_O) + \ln(S_O)) \tag{3}$$

The generator 13 calculates the radius R by substituting the focal length f and the distance $S_O$ acquired beforehand and the distance r1 in Formula (1). The generator 13 substitutes the radius R and the distance r2 in Formula (2) and substitutes the radius R and the distance r3 in Formula (3). The generator 13 calculates the tilt $\theta$ by solving these formulas. A length Le1 of the side between a vertex V1 and a vertex V2 of the rectangle Q is represented by the following Formula (4). A length Le2 of the side between a vertex V3 and a vertex V4 is represented by the following Formula (5).

$$Le1 = f \cdot R / (S_O + R \sin\theta) \tag{4}$$

$$Le2 = f \cdot R / (S_O - R \sin\theta) \tag{5}$$

The generator 13 calculates the lengths Le1 and Le2 by substituting the focal length f, the distance $S_O$, the radius R, and the tilt $\theta$ in Formula (4) and Formula (5). The generator 13 uses, as the rectangle Q, the rectangle that includes the calculated lengths Le1 and Let and has the smallest surface area. The generator 13 outputs the rectangle Q to the corrector 14.

Figure 2E:
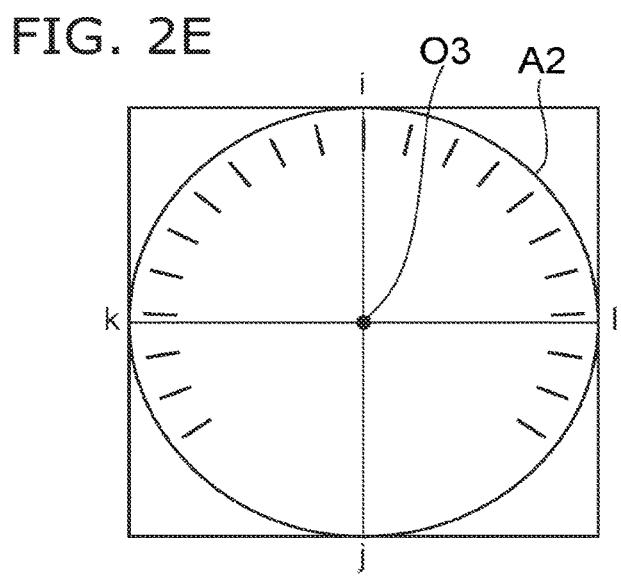

The corrector 14 performs a projective transformation of the rectangle Q to become a square. Thereby, the exterior form of the first candidate region A1 is corrected to approach a perfect circle; for example, a second candidate region A2 such as that illustrated in FIG. 2E is generated. At this time, the corrector 14 also may correct the size of the first candidate region A1 so that the first candidate region A1 approaches a specified size. The exterior form of the generated second candidate region A2 may not be a perfect circle. It is sufficient for the exterior form of the second candidate region A2 to be closer to a perfect circle than is the exterior form of the first candidate region A1.

For example, the corrector 14 outputs the generated second candidate region A2 to the reader 15. Or, the corrector 14 may perform the following determination for the second candidate region A2.

For example, the corrector 14 inverts a portion of the outer edge of the second candidate region A2 and overlays the portion and another portion of the outer edge of the second candidate region A2. The corrector 14 calculates the error amount between the portion of the outer edge of the second candidate region A2 and the other portion of the outer edge of the second candidate region A2 that are overlaid and compares the error amount to a preset first threshold.

For example, as illustrated in FIG. 2E, the corrector 14 draws a line segment ij that is parallel to the short side of the rectangle R and passes through a center O3 of the second candidate region A2. Then, the corrector 14 inverts and overlays one of a circular arc ikj at the left side of the line segment ij or a circular arc ilj at the right side of the line segment ij onto the other of the circular arc ikj or the circular arc ilj by using the line segment ij as the center. The corrector 14 calculates the error amount between the overlaid circular arc hji and circular arc hki and compares the error amount to the first threshold.

Or, the corrector 14 approximates the outer edge of the second candidate region A2 as a circle. The corrector 14 calculates the error amount between the approximated circle and the outer edge of the second candidate region A2 and compares the error amount to the first threshold.

When the error amount is less than the first threshold, the corrector 14 outputs the second candidate region A2 to the reader 15. By performing the determination, only the second candidate regions A2 that are closer to a perfect circle (having a small distortion) can be output to the reader 15.

When the error amount is not less than the first threshold, for example, the reading system 1 ends the processing of reading the generated second candidate region A2 and the first candidate region A1 that is the basis for the generated second candidate region A2. Or, more desirably, the reading system 1 performs the following processing.

When the error amount is not less than the first threshold, the corrector 14 outputs the determination result to the generator 13. When the determination result from the corrector 14 is input, the generator 13 changes the distance x and sets another point O2 within the range of the central region C. The generator 13 generates another rectangle Q based on the other point O2. The corrector 14 generates another second candidate region A2 by using the other rectangle Q to correct the first candidate region A1. The corrector 14 calculates the error amount for the other second candidate region A2.

For example, the generation of the rectangle Q and the generation of the second candidate region A2 described above are repeated until the corrector 14 determines that the error amount is less than the first threshold. When it is determined that the error amount is less than the first threshold, the corrector 14 outputs the other second candidate region A2 to the reader 15.

Or, when the input image is unclear, etc., there is a possibility that no error amount will be less than the first threshold even when multiple others of the second candidate regions A2 are generated. In such a case, for example, the corrector 14 outputs the second candidate region A2 for which the minimum error amount is obtained to the reader 15.

The reader 15 reads the numerical value indicated by the round meter from the second candidate region A2.

Specifically, the reader 15 includes a subdivider 15a, a graduation recognizer 15b, a numeral recognizer 15c, a pointer recognizer 15d, a graduation joiner 15e, and a calculator 15f.

Figure 3A:
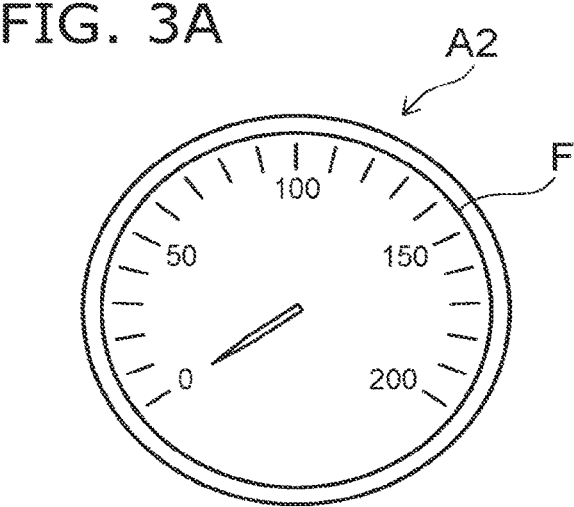
FIGS. 3A to 3D are schematic views for describing processing of a reader of the reading system according to the embodiment.
Figure 3B:
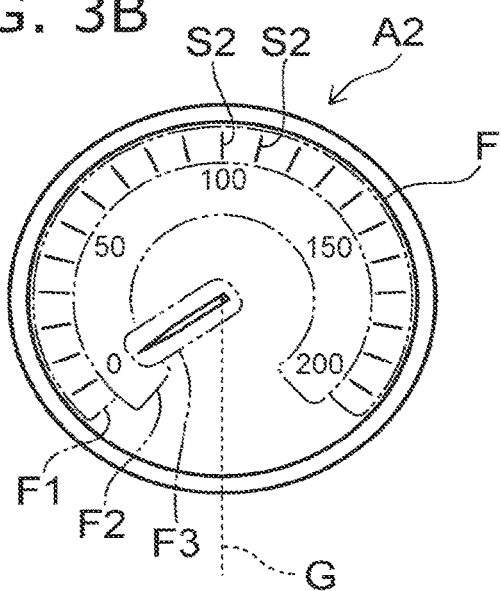

As illustrated in FIG. 3A, the subdivider 15a extracts a display panel region F of the round meter from the second candidate region A2. Then, as illustrated in FIG. 3B, the subdivider 15a subdivides the display panel region F into a scale region F1 where the graduations exist, a numeral region F2 where the numerical values of the display panel exist, and a pointer region F3 where the pointer of the display panel exists. The subdivider 15a determines a reference line G in the display panel region F. The reference line G is, for example, a straight line drawn directly downward from the center of the display panel region F.

For example, the subdivider 15a extracts line components from the second candidate region A2, and uses a Hough transform to extract the most circular line component. The region at the outer circumference portion of the extracted circle is used as the scale region F1. Typically, the background of the display panel is a relatively bright color (e.g., white), and the pointer and the numerals are a relatively dark color (e.g., black). Also, the pointer is provided more toward the center of the display panel than are the graduations and the numerals. By utilizing these aspects, the subdivider 15a extracts the numeral region F2 and the pointer region F3 from regions other than the scale region F1.

For example, the graduation recognizer 15b recognizes graduations S2 of the display panel as illustrated in FIG. 3B from the luminance difference in the scale region F1. Based on the recognized graduations S2, the graduation recognizer 15b also may determine whether or not the second candidate region A2 is corrected appropriately. For example, the graduation recognizer 15b causes the graduations S2 arranged in the circumferential direction to be arranged along one direction by performing a polar transformation. Then, the graduation recognizer 15b calculates at least one of the deviation amount of the spacing between the graduations S2, the deviation amount of the widths of the graduations S2, or the deviation amount of the shapes of the graduations S2. The graduation recognizer 15b compares the calculated deviation amount to a preset second threshold.

When the deviation amount is less than the second threshold, the processing continues to read the round meter. By performing the determination recited above, the read processing can be performed for only the display panel regions F having small distortions, and the reading accuracy of the value indicated by the round meter can be increased.

When the deviation amount is not less than the second threshold, for example, the reading system 1 ends the processing of the reading for the display panel region F. Or, more desirably, the reading system 1 performs the following processing.

When the deviation amount is not less than the second threshold, for example, the graduation recognizer 15b outputs the determination result and at least one of the deviation amounts recited above to the generator 13. When the determination result recited above is input, the generator 13 changes the distance x according to the deviation amount and sets another point O2 within the range of the central region C. The generator 13 generates another rectangle Q based on the other point O2. The corrector 14 generates another second candidate region A2 by using the other rectangle Q to correct the first candidate region A1. The graduation recognizer 15b recognizes the graduations S2 based on the other second candidate region A2 and calculates the deviation amount again.

For example, the generation of the rectangle Q, the generation of the second candidate region A2, and the recognition of the graduations S2 described above are repeated until the reader 15 determines that the deviation amount is less than the second threshold. When it is determined that the deviation amount is less than the second threshold, the reader 15 performs the read processing by using the scale region F1, the numeral region F2, and the pointer region F3 based on the display panel region F.

Or, there are cases where no deviation amount will be less than the second threshold even when multiple others of the second candidate regions A2 are generated. In such a case, for example, the reader 15 performs the read processing by using the scale region F1, the numeral region F2, and the pointer region F3 based on the display panel region F for which the minimum deviation amount is obtained.

Figure 3C:
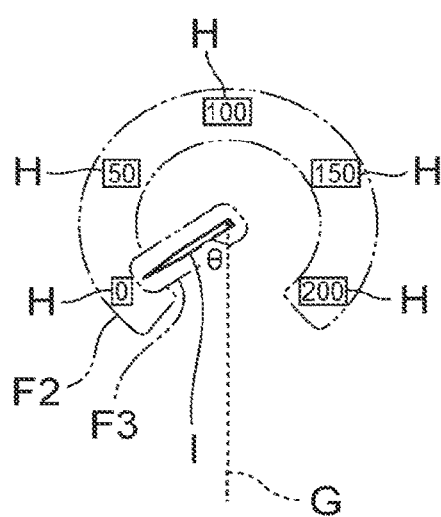

When the graduation recognizer 15b determines that the deviation amount is less than the second threshold, the numeral recognizer 15c cuts out numerals from the numeral region F2. For example, as illustrated in FIG. 3C, the numeral recognizer 15c cuts out rectangles H including the numerals from the numeral region F2. The numeral recognizer 15c recognizes the numerals included in the rectangles H. The pointer recognizer 15d detects an angle θ between the reference line G and a pointer I included in the pointer region F3.

Figure 3D:
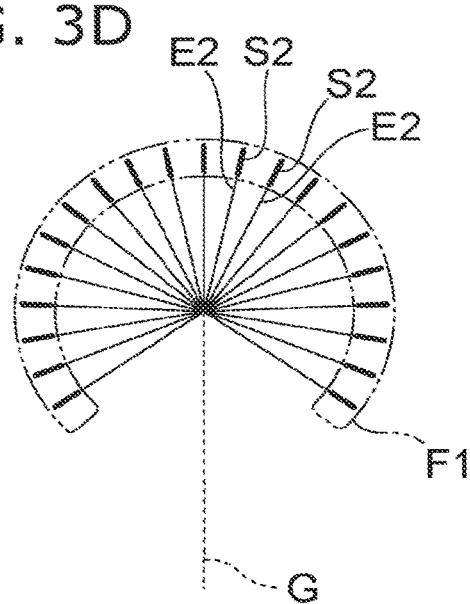

As illustrated in FIG. 3D, the graduation joiner 15e extracts, as position information of each graduation, the angle between the reference line G and a straight line E2 extending through the graduation S2. The graduation joiner 15e determines the numerals corresponding to the recognized graduations S2.

The calculator 15f calculates the numerical value indicated by the pointer based on the position information of the graduations S2, the correspondence information of the graduations S2 and the numerals, and the angle of the pointer. For example, the reader 15 outputs the calculated numerical value to the outside.

Figure 4A:
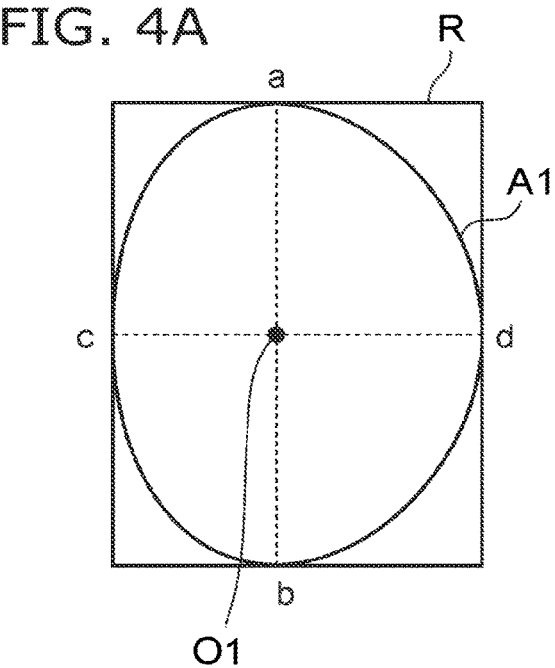
FIGS. 4A to 4C are schematic views for describing processing of the generator and the corrector of the reading system according to the embodiment.
Figure 4B:
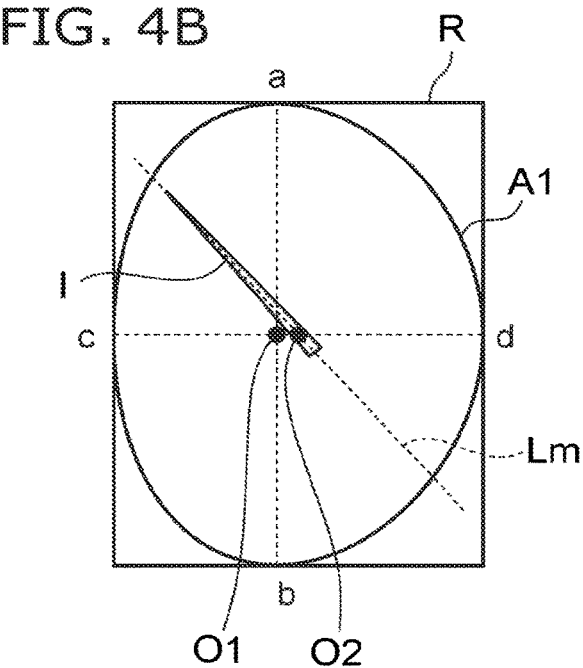
Figure 4C:
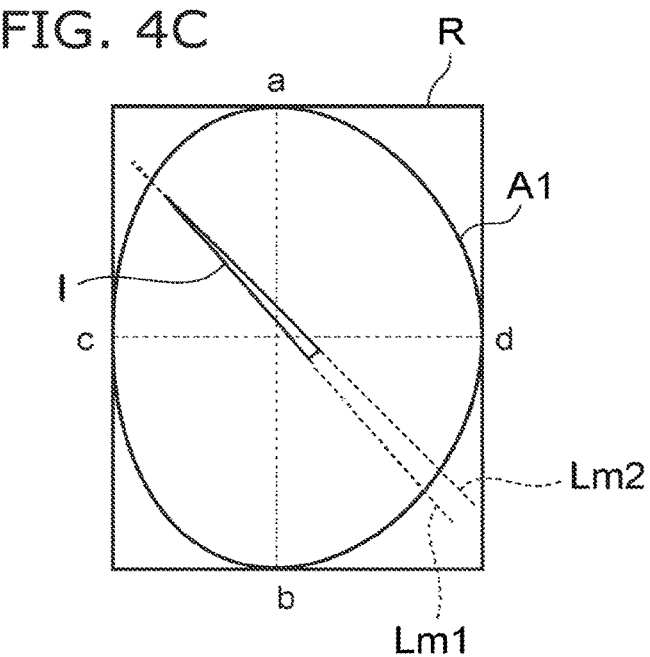

FIGS. 4A to 4C are schematic views for describing processing of the generator and the corrector of the reading system according to the embodiment.

The generator 13 may detect the center of the round meter by using the following third method. First, as illustrated in FIG. 4A, the generator 13 detects the rectangle R that circumscribes the first candidate region A1. The contact points of the first candidate region A1 and the rectangle R are taken as the points a to d. A line segment that connects the point a and the point b is taken as a major axis ab, and a line segment that connects the point c and the point d is taken as a minor axis cd. The intersection of the line segment ab and the line segment cd is taken as O1. The generator 13 generates a straight line Lm along the pointer I of the round meter from the luminance difference in the first candidate region A1 and the result of a Hough transform. As illustrated in FIG. 4B, the generator 13 uses the intersection of the straight line Lm and the minor axis (the line segment cd) of the first candidate region A1 as a center O2 of the round meter.

For example, the generator 13 generates the straight line Lm by using the following method. First, the generator 13 uses the result of the Hough transform to extract one or more line segments having not less than a prescribed length based on the size of the first candidate region A1. Then, the generator 13 extends each of the extracted line segments, and extracts, as the straight line Lm, a straight line that passes through the region estimated to be the center of the circular meter. For example, the region that is estimated to be the center of the circular meter is set to the vicinity of the intersection O1 of the major axis ab and the minor axis cd of the circumscribing rectangle R illustrated in FIG. 4A.

When straight lines along the pointer I are generated by the method described above, there are cases where two straight lines Lm1 and Lm2 along two ends of the pointer I are generated as illustrated in FIG. 4C. In such a case, the generator 13 generates a straight line passing through the center between the straight lines Lm1 and Lm2 and uses the generated straight line as the straight line Lm.

The generator 13 generates the rectangle Q by calculating the distances r1 to r3 illustrated in FIG. 2D based on the center set by the third method. In such a case, the center of the round meter can be determined more accurately. Accordingly, the calculation of the error amount by the corrector 14, the calculation of the deviation amount using the graduation recognizer 15b, etc., may be omitted.

Figure 5:
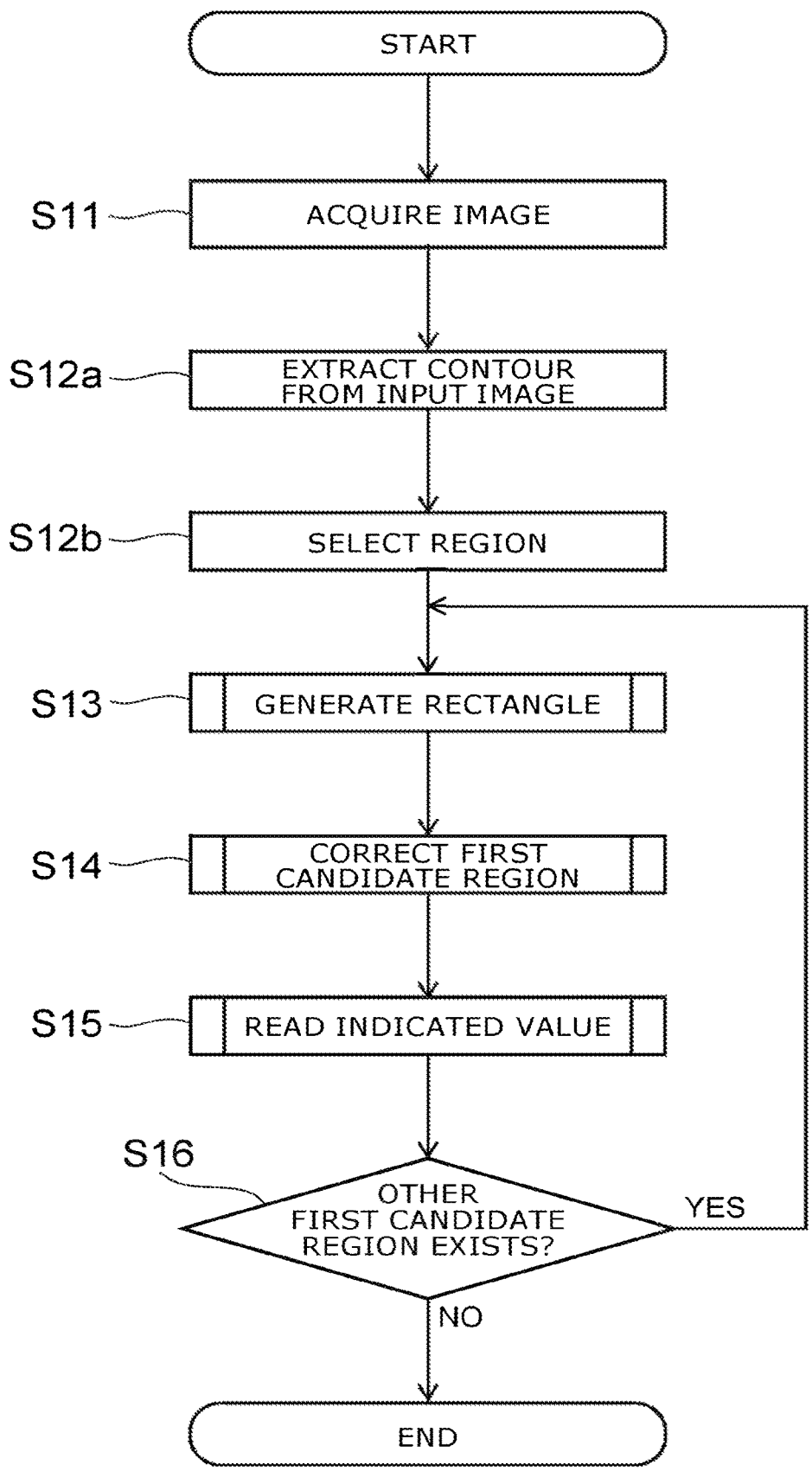
FIG. 5 is a flowchart illustrating operations of the reading system according to the embodiment.
Figure 6:
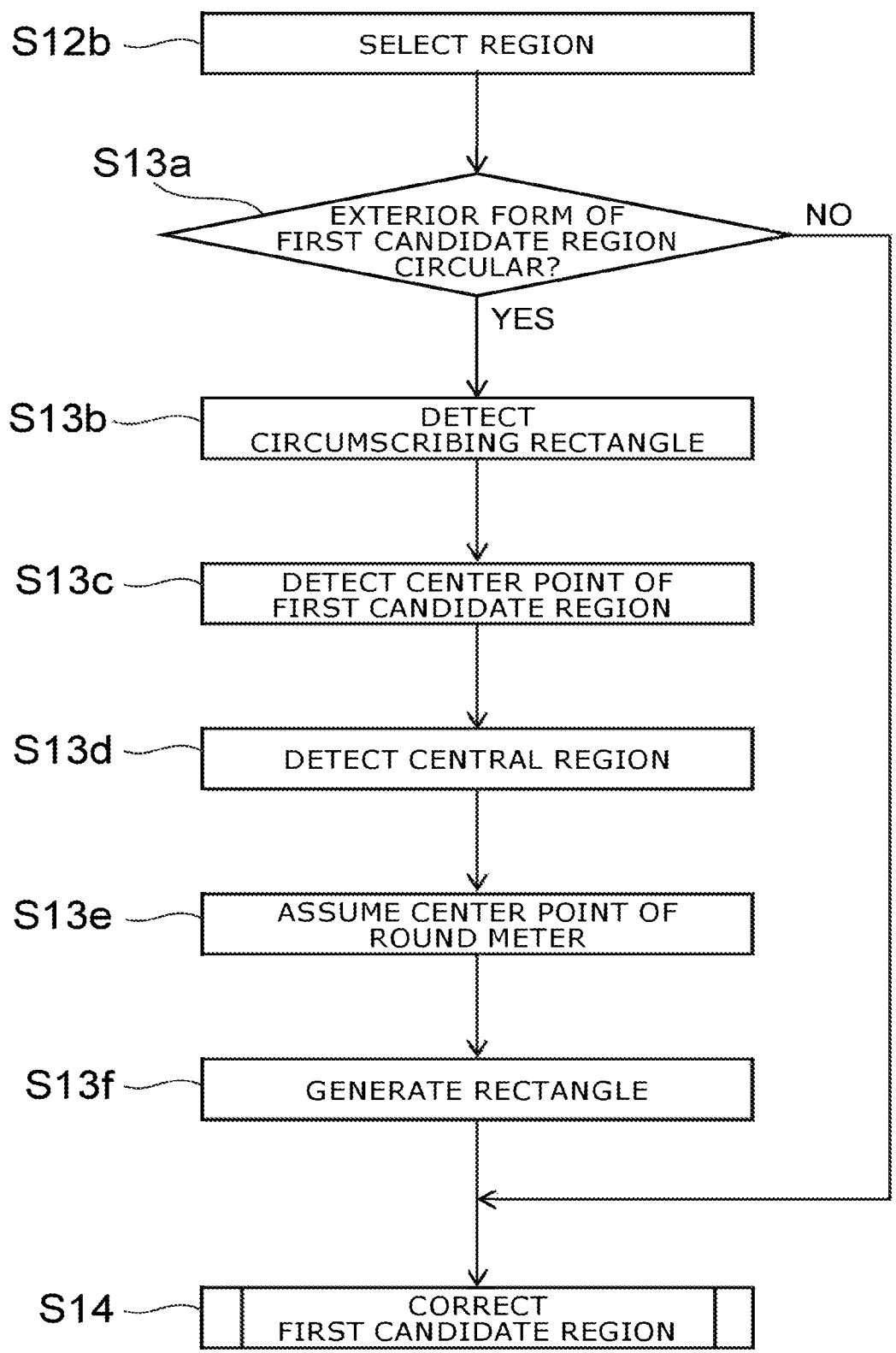
FIG. 6 is a flowchart illustrating operations of the reading system according to the embodiment.
Figure 7:
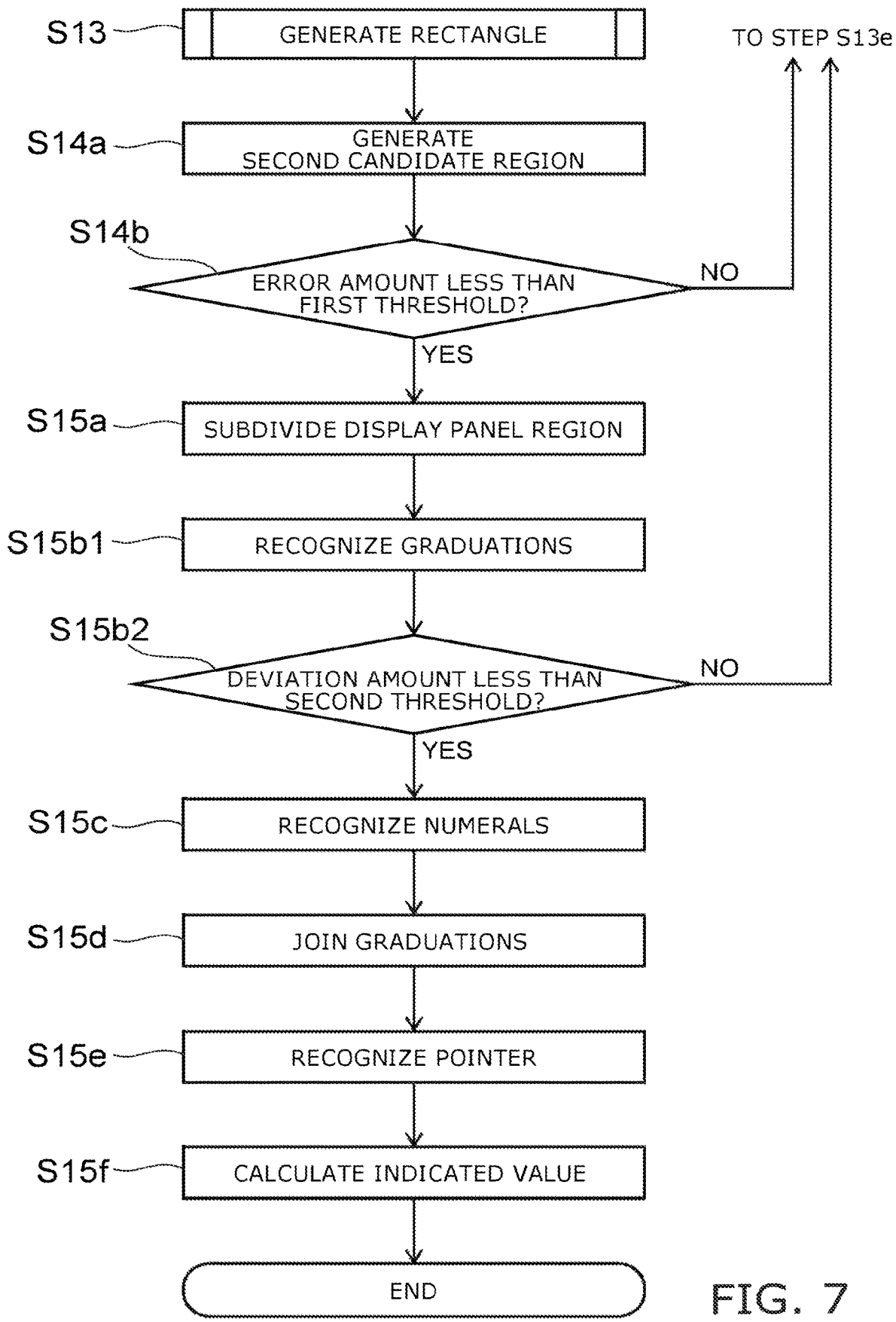
FIG. 7 is a flowchart illustrating operations of the reading system according to the embodiment.

FIG. 5 to FIG. 7 are flowcharts illustrating operations of the reading system according to the embodiment.

FIG. 6 is a flowchart illustrating detailed operations of step S13 of FIG. 5. FIG. 7 is a flowchart illustrating detailed operations of steps S14 and S15 of FIG. 5.

As illustrated in FIG. 5, first, the reading system 1 uses the imager 11 to acquire an image including a round meter (step S11). The contour extractor 12a extracts a contour included in the input image (step S12a). The selector 12b calculates the surface area of a region surrounded with the contour. The selector 12b detects the shape of the contour. The selector 12b selects only regions that have surface areas not less than a threshold and have circular or rectangular contours (step S12b). The selector 12b outputs the selected region to the generator 13 as the first candidate region.

Then, a rectangle that circumscribes the first candidate region is generated (step S13), a second candidate region is generated (step S14), and an indicated value is read (step S15). Subsequently, it is determined whether or not another first candidate region exists (step S16). When another first candidate region exists, step S13 is performed for the other first candidate region.

In step S13 as illustrated in FIG. 6, the generator 13 determines whether or not the exterior form of the first candidate region is circular (step S13a). When the exterior form of the first candidate region is circular, the generator 13 generates a rectangle that circumscribes the first candidate region (step S13b). The generator 13 detects the center point of the first candidate region from the first candidate region and the circumscribing rectangle (step S13c). The generator 13 detects a central region including the center of the round meter (step S13d). The generator 13 assumes a point in the central region to be the center point of the round meter (step S13e). The generator 13 uses the virtual center point to generate a rectangle around the first candidate region (step S13f).

In step S14 as illustrated in FIG. 7, the corrector 14 generates a second candidate region by using the rectangle to correct the first candidate region (step S14a). The corrector 14 calculates an error amount for the second candidate region and compares the error amount and the first threshold (step S14b). When the error amount is not less than the first threshold, the flow returns to step S13e, and another virtual center point is set.

The subdivider 15a extracts the display panel region of the round meter from the second candidate region and subdivides the display panel region into a scale region, a numeral region, and a pointer region (step S15a). The graduation recognizer 15b recognizes the graduations of the display panel (step S15b1). The graduation recognizer 15b calculates a deviation amount for the recognized graduations and compares the deviation amount to the second threshold (step S15b2). When the deviation amount is not less than the second threshold, the flow returns to step S13e, and another virtual center point is set.

The numeral recognizer 15c recognizes numerals from the numeral region (step S15c). The pointer recognizer 15d detects the angle of a pointer included in the pointer region (step S15d). The graduation joiner 15e extracts position information of the graduations and correspondence information of the graduations and the numerals (step S15e). The calculator 15f calculates a value indicated by the round meter from the position information of the graduations, the correspondence information of the graduations and the numerals, and the angle of the pointer (step S15f). Subsequently, it is determined whether or not another first candidate region exists (step S16). When another first candidate region exists, step S13a is performed for the other first candidate region.

Effects of the embodiments will now be described.

In a reading system for reading a numerical value of a round meter, when the round meter is distorted in the input image, for example, the image is corrected by utilizing a rectangular outer frame attached to the round meter. By appropriately correcting the distortion and/or the size of the image, the numerical value that is indicated by the round meter can be read with higher accuracy. However, there are round meters that do not have a rectangular outer frame. In such a case, in a conventional technique, the image cannot be corrected appropriately, and the reading accuracy of the indicated value of the round meter decreases.

For this problem, in the embodiment, the reading system 1 includes the generator 13. When the exterior form of the first candidate region is circular, the generator 13 generates a rectangle around the exterior form. Because the rectangle is generated by the generator 13, the first candidate region can be corrected using the circumscribing rectangle.

Accordingly, according to the embodiment, even when the round meter does not include a rectangular outer frame, the first candidate region can be corrected appropriately, and the numerical value that is indicated by the round meter can be read with higher accuracy.

In the reading system 1, the corrector 14 determines whether or not the first candidate region is corrected appropriately based on the error amount of the second candidate region. By performing the determination, the reading of the indicated value can be performed for an image having less distortion, and the reading accuracy is increased.

In the reading system 1, the reader 15 determines whether or not the first candidate region is corrected appropriately based on the deviation amount of the graduations extracted from the second candidate region. By performing the determination, similarly to the description recited above, the reading of the indicated value can be performed for an image having less distortion, and the reading accuracy is increased.

Figure 8:
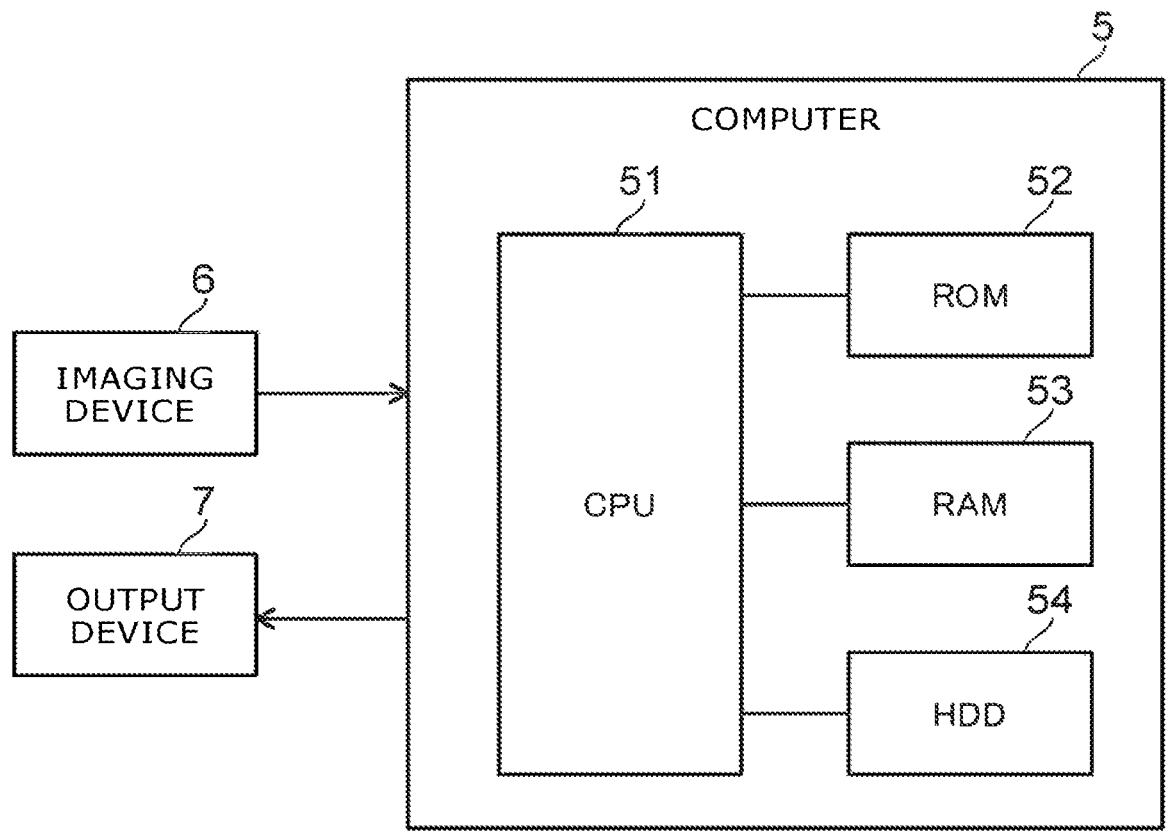
FIG. 8 is a block diagram illustrating a hardware configuration for realizing the reading systems according to the embodiments.

FIG. 8 is a block diagram illustrating a hardware configuration for realizing the reading systems according to the embodiments.

For example, the reading systems according to the embodiments include a reading device 5 and an imaging device 6 illustrated in FIG. 8. The reading device 5 is, for example, a computer and includes ROM (Read Only Memory) 51, RAM (Random Access Memory) 52, a CPU (Central Processing Unit) 53, and a HDD (Hard Disk Drive) 54.

The ROM 51 stores programs controlling the operations of the computer. The ROM 51 stores programs necessary for causing the computer to function as the extractor, the converter, the corrector, the reader, etc., of the embodiments described above.

The RAM 52 functions as a memory region where the programs stored in the ROM 51 are loaded. The CPU 53 reads a control program stored in the ROM 51 and controls the operation of the computer according to the control program. The CPU 53 loads various data obtained by the operation of the computer into the RAM 52. The HDD 54 stores information necessary for reading and information obtained in the reading process.

Instead of the HDD 54, the reading device 5 may include an eMMC (embedded Multi Media Card), a SSD (Solid State Drive), a SSHD (Solid State Hybrid Drive), etc.

The imaging device 6 images the subject (the round meter) and transmits the acquired image to the reading device 5. The imaging device 6 is, for example, a camera.

An output device 7 outputs the data (the indicated value of the round meter that is read) output from the reading device 5 so that the user can recognize the data. The output device 7 is, for example, a monitor, a printer, a speaker, etc.

For example, the reading device 5, the imaging device 6, and the output device 7 are connected to each other by a wired or wireless technique. Or, these devices may be connected to each other via a network. Or, at least two of the reading device 5, the imaging device 6, or the output device 7 may be embedded in one device. For example, the reading device 5 may be embedded in an integral body with an image processor of the imaging device 6, etc.

An embodiment of the invention includes the following program.

A program causing a computer to:
  extract a first candidate region from an input image, the first candidate region being a candidate of a region in which a meter is imaged;
  generate a rectangle around the first candidate region when an exterior form of the first candidate region is circular, the rectangle corresponding to the exterior form of the first candidate region;
  generate a second candidate region by using the generated rectangle to correct the exterior form of the first candidate region to approach a perfect circle; and
  read, from the second candidate region, a numerical value indicated by the meter.

By using the reading systems and the reading methods according to the embodiments described above, a numerical value that is indicated by a meter can be read with higher accuracy. Similarly, a numerical value that is indicated by a meter can be read by a computer with higher accuracy by using a program for causing the computer to operate as the reading system.

While certain embodiments have been described, these embodiments have been presented by way of example only, and are not intended to limit the scope of the inventions. Indeed, the novel embodiments described herein may be embodied in a variety of other forms; furthermore, various omissions, substitutions, and changes in the form of the embodiments described herein may be made without departing from the spirit of the inventions. The accompanying claims and their equivalents are intended to cover such forms or modifications as would fall within the scope and spirit of the invention. The above embodiments can be practiced in combination with each other.

What is claimed is:

1. A processor,
the processor detecting a central region including a center of a meter in a case where an exterior form of a first candidate region is circular, the first candidate region being of a candidate of a region in which the meter is imaged and included in an input image, the central region being detected by using a pointer and a graduation of the meter; and
the processor generating a rectangle around the first candidate region based on a detection result of the central region, the rectangle corresponding to the exterior form of the first candidate region, wherein
the processor
generates a second candidate region by approximating the exterior form of the first candidate region as a circle using the generated rectangle; and
reads, from the second candidate region, a numerical value indicated by the meter, and
when generating the second candidate region, the processor
approximates an outer edge of the second candidate region as a circle;
calculates an error amount between the approximated circle and the outer edge of the second candidate region; and
reads the numerical value from the second candidate region in a case where the error amount is less than a first threshold.

2. The processor according to claim 1, wherein
the processor generates an other of the rectangles around the first candidate region in a case where the error amount is not less than the first threshold, and
when generating the second candidate region, the processor:
generates an other of the second candidate regions by using the other of the rectangles to correct the first candidate region; and
reads the numerical value from the other of the second candidate regions in a case where the error amount based on the other of the second candidate regions is less than the first threshold.

3. The processor according to claim 1, wherein when reading the numerical value, the processor:
recognizes a plurality of graduations from the second candidate region;
calculates a deviation amount of at least one of spacings between the graduations, widths of the graduations, or angles between the graduations; and
reads the numerical value from the second candidate region in a case where the deviation amount is less than a second threshold, the second threshold being preset.

4. The processor according to claim 3, wherein the processor:
generates an other of the rectangles around the first candidate region in a case where the deviation amount is not less than the second threshold;
generates an other of the second candidate regions by using the other of the rectangles to correct the first candidate region; and
reads the numerical value from the other of the second candidate regions when the deviation amount based on the other of the second candidate regions is less than the second threshold.

5. The processor according to claim 3, wherein the processor:
generates a plurality of others of the rectangles around the first candidate region when an error amount is not less than the second threshold;
generates a plurality of others of the second candidate regions by using the plurality of others of the rectangles to correct the first candidate region;
calculates a plurality of the deviation amounts based on the plurality of others of the second candidate regions; and
reads the numerical value from the other of the second candidate regions in which a minimum of the deviation amounts is obtained.

6. The processor according to claim 1, wherein the processor generates the rectangle to circumscribe the first candidate region.

7. A processor,
the processor detecting a central region including a center of a meter in a case where an exterior form of a first candidate region is circular, the first candidate region being of a candidate of a region in which the meter is imaged and included in an input image, the central region being detected by using a pointer and a graduation of the meter; and
the processor generating a rectangle around the first candidate region based on a detection result of the central region, the rectangle corresponding to the exterior form of the first candidate region, wherein
the processor
generates a second candidate region by approximating the exterior form of the first candidate region as a circle using the generated rectangle; and
reads, from the second candidate region, a numerical value indicated by the meter, and
when generating the second candidate region, the processor:
calculates an error amount by inverting a portion of an outer edge of the second candidate region and overlaying the inverted portion and an other portion of the outer edge of the second candidate region; and
reads the numerical value from the second candidate region in a case where the error amount is less than a first threshold.

8. The processor according to claim 7, wherein
the processor generates a plurality of others of the rectangles around the first candidate region in a case where the error amount is not less than the first threshold, and
when generating the second candidate region, the processor:
generates a plurality of others of the second candidate regions by using the plurality of others of the rectangles to correct the first candidate region;

calculates a plurality of the error amounts based on the plurality of others of the second candidate regions; and reads the numerical value from the other of the second candidate regions in which a minimum of the error amounts is obtained.

9. The processor according to claim 7, wherein when reading the numerical value, the processor:
recognizes a plurality of graduations from the second candidate region;
calculates a deviation amount of at least one of spacings between the graduations, widths of the graduations, or angles between the graduations; and
reads the numerical value from the second candidate region in a case where the deviation amount is less than a second threshold, the second threshold being preset.

10. The processor according to claim 9, wherein the processor:
generates an other of the rectangles around the first candidate region in a case where the deviation amount is not less than the second threshold;
generates an other of the second candidate regions by using the other of the rectangles to correct the first candidate region; and
reads the numerical value from the other of the second candidate regions when the deviation amount based on the other of the second candidate regions is less than the second threshold.

11. The processor according to claim 9, wherein the processor:
generates a plurality of others of the rectangles around the first candidate region when an error amount is not less than the second threshold;
generates a plurality of others of the second candidate regions by using the plurality of others of the rectangles to correct the first candidate region;
calculates a plurality of the deviation amounts based on the plurality of others of the second candidate regions; and
reads the numerical value from the other of the second candidate regions in which a minimum of the deviation amounts is obtained.

12. The processor according to claim 7, wherein the processor generates the rectangle to circumscribe the first candidate region.

13. A processing method, the processing method causing a computer to:
detect a central region including a center of a meter in a case where an exterior form of a first candidate region is circular, the first candidate region being of a candidate of a region in which the meter is imaged and included in an input image, the central region being detected by using a pointer and a graduation of the meter; and
generate a rectangle around the first candidate region based on a detection result of the central region, the rectangle corresponding to the exterior form of the first candidate region, wherein
the processing method causes the computer to
generate a second candidate region by approximating the exterior form of the first candidate region as a circle using the generated rectangle; and
read, from the second candidate region, a numerical value indicated by the meter, and
when generating the second candidate region, the processing method causes the computer to
approximate an outer edge of the second candidate region as a circle;
calculate an error amount between the approximated circle and the outer edge of the second candidate region; and
read the numerical value from the second candidate region in a case where the error amount is less than a first threshold.

14. The method according to claim 13, wherein when reading the numerical value, the processing method causing the computer to:
recognize a plurality of graduations from the second candidate region;
calculate a deviation amount of at least one of spacings between the graduations, widths of the graduations, or angles between the graduations; and
read the numerical value from the second candidate region in a case where the deviation amount is less than a second threshold, the second threshold being preset.

15. A non-transitory computer readable storage medium storing a program, the program causing a computer to perform the method according to claim 13.

16. A processing method, the processing method causing a computer to:
detect a central region including a center of a meter in a case where an exterior form of a first candidate region is circular, the first candidate region being of a candidate of a region in which the meter is imaged and included in an input image, the central region being detected by using a pointer and a graduation of the meter; and
generate a rectangle around the first candidate region based on a detection result of the central region, the rectangle corresponding to the exterior form of the first candidate region, wherein
the processing method causes the computer to
generate a second candidate region by approximating the exterior form of the first candidate region as a circle using the generated rectangle; and
read, from the second candidate region, a numerical value indicated by the meter, and
when generating the second candidate region, the processing method causes the computer to
calculate an error amount by inverting a portion of an outer edge of the second candidate region and overlaying the inverted portion and an other portion of the outer edge of the second candidate region; and
read the numerical value from the second candidate region in a case where the error amount is less than a first threshold.

17. The method according to claim 16, wherein when reading the numerical value, the processing method causing the computer to:
recognize a plurality of graduations from the second candidate region;
calculate a deviation amount of at least one of spacings between the graduations, widths of the graduations, or angles between the graduations; and
read the numerical value from the second candidate region in a case where the deviation amount is less than a second threshold, the second threshold being preset.

18. A non-transitory computer readable storage medium storing a program, the program causing a computer to perform the method according to claim 16.

* * * * *